Figure 1:
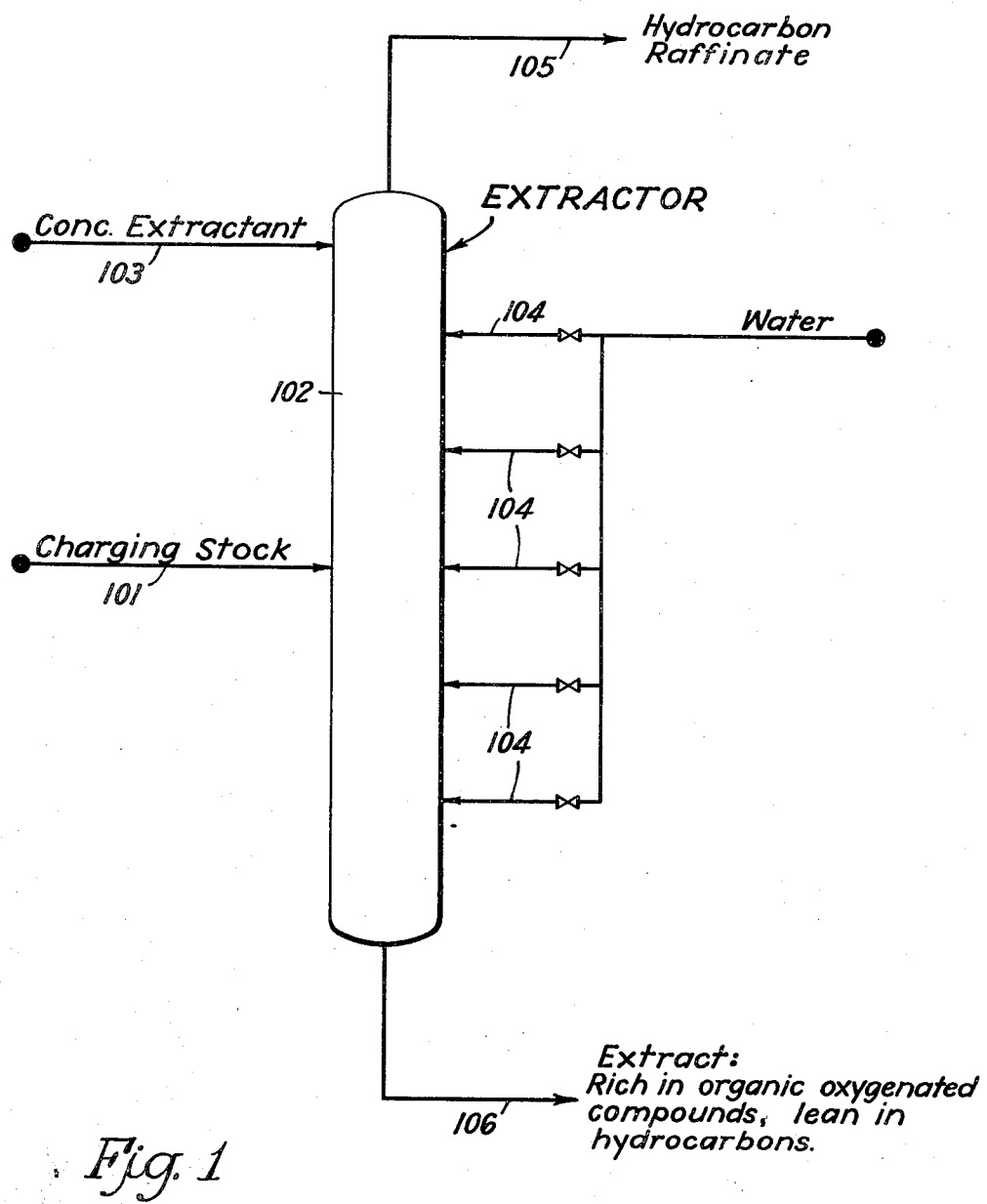

Dec. 26, 1950     E. A. JOHNSON     2,535,069
SEPARATION OF ORGANIC OXYGENATED
COMPOUNDS FROM HYDROCARBONS
Filed Aug. 12, 1948     3 Sheets-Sheet 3

INVENTOR.
Everett A. Johnson
BY
Everet F. Smith
PATENT AGENT

Patented Dec. 26, 1950

2,535,069

UNITED STATES PATENT OFFICE 2,535,069

SEPARATION OF ORGANIC OXYGENATED COMPOUNDS FROM HYDROCARBONS

Everett A. Johnson, Park Ridge, Ill., assignor to Standard Oil Company, Chicago, Ill., a corporation of Indiana Application August 12, 1948, Serial No. 43,888

11 Claims. (Cl. 260—450)

This invention relates to the separation of organic oxygenated compounds from mixtures thereof with hydrocarbons, and more particularly to a method for segregating, separating, and purifying alcohols, aldehydes, and/or ketones from hydrocarbon solutions.

My invention is an improvement in the method for separating organic oxygenated compounds from hydrocarbon solutions comprised thereof by extracting the organic oxygenated compounds with an aqueous extractant solution comprising an organic-acid salt or soap. I have discovered that improved results are obtained in such processes by carrying out the extraction in countercurrent or in a plurality of stages in counterflow, while progressively diluting the extractant solution with water.

My process is suitable in general for the separation of organic oxygenated compounds from mixtures thereof with hydrocarbons. Numerous examples of such mixtures are known to the art and are produced as primary products or by-products of various processes. For example, mixtures of organic oxygenated compounds and hydrocarbons may be prepared by the direct oxidation of hydrocarbon liquids and gases, by the reaction of olefins with carbon monoxide and hydrogen in the Oxo process, and by the hydrogenation of carbon monoxide by a wide variety of techniques, including the "synthol" process, the "Fischer-Tropsch" process, and the newly developed processes employing fluidized, alkali-promoted iron catalysts.

My invention is especially well adapted to processing the hydrocarbon stream resulting from the fluidized, alkali-promoted iron process for the hydrogenation of carbon monoxide. When produced under the following approximate conditions, such a hydrocarbon stream may contain up to 40 percent or more of organic oxygenated compounds:

Catalyst, iron
Promoter, potassium carbonate
Promoter concentration, 0.5–2.0 percent by weight
Temperature, 550–650° F.
Pressure, 100–500 lb./in.$^2$, gage
Space velocity, 4–20 cu. ft. CO, measured at 60° F. and 1 atmosphere, per pound of iron per hour
CO concentration in feed, 10–20 percent by volume
$H_2$:CO ratio in total feed, 1.5–6

The hydrocarbon stream produced under such conditions is a complex mixture that contains a wide range of saturated and unsaturated hydrocarbons, from methane to high-melting waxes, a wide range of oil-soluble organic oxygenated compounds, including aliphatic aldehydes, aliphatic alcohols, aliphatic ketones, alkanoic acids, and phenols, together with substantial proportions of the lower homologues of such compounds (other than phenols), which are ordinarily classified as water-soluble. The following organic oxygenated compounds, and others, have been identified in such reaction products: acetaldehyde, propionaldehyde, butyraldehyde, isobutyraldehyde, and higher aliphatic aldehydes; acetone, methyl ethyl ketone, methyl n-propyl ketone, methyl n-butyl ketone, and higher aliphatic ketones; methanol, ethanol, n-propyl alcohol, n-butyl alcohol, isobutyl alcohol, n-pentyl alcohol, n-octyl alcohol, and higher aliphatic alcohols; acetic acid, propionic acid, butyric acid, 2-methylbutyric acid, valeric acid, 3-methylvaleric acid, 2-methylhexanoic acid, caprylic acid, capric acid, myristic acid, palmitic acid, stearic acid, and other aliphatic carboxylic acids; esters derivable from the foregoing alcohols and acids, such as methyl acetate, ethyl acetate, ethyl butyrate, and the like; formals, acetals, and ketals derivable from the foregoing aldehydes, ketones, and alcohols; and phenol and higher phenols.

Organic oxygenated compounds of the group consisting of alcohols, aldehydes, and ketones may conveniently be removed from hydrocarbon solutions thereof by extraction with an aqueous solution of a salt of a carboxylic acid, preferably an acid containing less than twelve carbon atoms in the molecule, and the maximum extraction efficiency is obtained by employing a concentrated extractant solution containing in excess of about 30 percent by weight of carboxylic-acid salts, as disclosed and claimed in the copending application of Scott W. Walker, Serial No. 771,264, filed August 29, 1947, and in the continuation-in-part thereof, Serial No. 134,475, filed December 22, 1949. It has been discovered, however, as will be shown in the specific example below, that concentrated extractant solutions simultaneously dissolve a substantial quantity of hydrocarbons, the proportion of hydrocarbons to organic oxygenated compounds in the resulting aqueous extract becoming rapidly greater at the higher concentrations of solubilizer salts. For example, when the process conditions are adjusted to extract around 90 percent by volume of the organic oxygenated compounds contained in the charging stock, utilizing an extractant solution containing 50 to 60 percent by weight of solubilizer salts, the volume of extracted hydrocarbons may even be somewhat greater than the volume of extracted organic oxygenated compounds. The ratio of organic oxygenated compounds to hydrocarbons in the extract is always more favorable than in the charging stock; nevertheless, the further separation of the extracted organic oxygenated compounds from the extracted hydrocarbons is difficult, since the hydrocarbons ordinarily boil throughout the entire range of the organic oxygenated compounds, and the two groups of compounds cannot therefore be separated by conventional fractional distillation means.

I have now devised an improved process which is capable of producing high extraction efficiencies while avoiding excessive hydrocarbon contamination of the resulting extract. In a simple embodiment of my process, a charging stock comprising an organic oxygenated compound and a hydrocarbon is countercurrently contacted with an aqueous extractant solution initially containing in excess of 30 percent by weight of the defined class of solubilizer salts, preferably between 40 and 60 percent, and spaced injection of water to the extraction zone is simultaneously effected, so that the aqueous extract emerging therefrom contains less than 30 percent by weight of solubilizer salts, preferably between 5 and 20 percent. Thus, the hydrocarbon stream leaving the extraction zone is contacted last with concentrated extractant solution, so that maximum extraction is effected; and the aqueous extract leaving the extraction zone contains a reduced concentration of solubilizer salts, so that the percentage of hydrocarbon contaminant is minimized.

It will be apparent that the advantageous features of my new process may be achieved by numerous modifications of the simple embodiment described above. For example, the progressive dilution feature of my invention effects a reduction in the hydrocarbon contamination of the resulting aqueous extract regardless of the initial concentration of solubilizer salts in the aqueous extractant solution. Hence, the initial concentration thereof is not a critical variable in my process, although in order to obtain high extraction efficiencies I ordinarily choose to use a solution having a salt concentration above 30 percent. As another example, I may carry out the extraction in a multiplicity of stages, each of which may be the batchwise single-effect type or the countercurrent type, with appropriate interflow of process streams. It will be further apparent that I may employ numerous recycle features, such as the reconcentration and recycle of the lean aqueous extract, and the recovery of water therefrom for recycle to the extraction zone.

One object of my invention is to effect the separation and recovery of organic oxygenated compounds from admixture with hydrocarbons. Another object of my invention is to provide a process for recovering organic oxygenated compounds, such as alcohols, aldehydes, ketones, carboxylic acids, and phenolic compounds, from hydrocarbon solutions thereof, such as hydrocarbon solutions resulting from the oxidation of hydrocarbon gases, or from the hydrogenation of oxides of carbon, in particular carbon monoxide. A further object of my invention is to provide a method for effecting the substantially complete extraction of organic oxygenated compounds from hydrocarbon solutions thereof and simultaneously producing an aqueous extract containing said organic oxygenated compounds with a minimum proportion of contaminating hydrocarbons. An additional object of my invention is to produce a hydrocarbon product relatively free of oxygenated compounds, and a subsidiary object is to produce a motor fuel of relatively good odor and of improved stability with respect to antiknocking rating. Other objects of my invention, and its advantages over the prior art, will be apparent from the following description.

Figure 1 represents a simple embodiment of my invention. A charging stock comprising organic oxygenated compounds and hydrocarbons, suitably prepared by the hydrogenation of carbon monoxide in the presence of a fluidized, alkali-promoted catalyst, as described above, is introduced through line 101 into extraction column 102 at an intermediate point. A concentrated aqueous extractant solution of water-soluble salts of a mixture of the preferentially oil-soluble carboxylic acids similar to those contained in the charging stock is introduced into the top of extraction column 102 through line 103. As the extractant solution flows downward countercurrent to the charging stock, it is progressively diluted with water, added through valved lines 104 at a multiplicity of points throughout the length of the extraction column. A hydrocarbon raffinate stream, substantially depleted of organic oxygenated compounds, emerges overhead through line 105; and an aqueous extract stream, rich in organic oxygenated compounds and containing only a minor proportion of hydrocarbons, emerges from the bottom of extraction column 102 through line 106.

The aqueous extractant solution employed in my process contains a solubilizer comprising a water-soluble salt of a carboxylic acid, such as an alkanoate, a cycloalkanecarboxylate a benzenecarboxylate or other aromatic carboxylate, or a heterocyclic carboxylate, of an alkali metal, in particular sodium and potassium, or of ammonium or a substituted ammonium. Such salts are to be understood as including both the so-called fatty-acid soaps and the comparatively non-surface-active carboxylic-acid salts. I prefer, however, to use an extractant solution containing a solubilizer comprising a salt of an alkanoic acid containing less than twelve carbon atoms in the molecule, as a means of avoiding emulsification troubles during the extraction procedure. Such salts are substantially non-surface-active, and show little or no tendency to form emulsions under the conditions employed in my process, in contrast to the fatty-acid soaps, such as sodium oleate and sodium stearate. It is unnecessary to exclude surface-active soaps entirely from the aqueous extractant solution in order to avoid emulsification difficulties, but the solubilizer salts should comprise predominantly the non-surface-active constituents as defined above, and should preferably contain around 75 percent or more of such non-surface-active constituents. The salts of various mixtures of organic acids, moreover, are distinctly superior to salts of single acids; and it is especially advantageous to use salts of the organic acids, including carboxylic acids and phenols, produced by the hydrogenation of carbon monoxide in the prior-art processes. Such mixtures ordinarily consist predominantly of alkanoates, and have an average of less than eleven carbon atoms in the molecule.

The class of substantially non-surface-active carboxylic-acid salts that I prefer to use in the extractant solutions of my process are to be understood as including alkanoates such as acetates, propionates, valerates, caproates, undecanoates, and the like, of the alkali-metals, in particular sodium and potassium, and of ammonium and substituted ammoniums; alkenoates such as acrylates, crotonates, isocrotonates, and the like; alkanedioates such as malonates, adipates, azelates, sebacates, and the like; alkenedioates such as maleates, fumarates, and the like; cycloalkanecarboxylates such as cyclopentanecarboxylates, cyclohexanecarboxylates, and the like; and arylcarboxylates such as benzoates, phthalates, and the like.

My extractant solution may also include one or more inorganic salts, such as the chloride, bromide, sulfate, phosphate, nitrate, or the like, of a cation chosen from the group set forth above. The concentration of such salt may suitably be up to the level required to saturate the aqueous extractant solution.

In carrying out the extraction of organic oxygenated compounds from hydrocarbons according to the process of my invention, I may operate at temperatures from somewhat below room temperature to as high as 100° C. or above, and at reduced, ordinary, or elevated pressures, so long as the extractant solution and the charging stock remain liquid under the process conditions. I prefer, however, to operate at temperatures between about 20 and 50° C., and at ordinary pressures.

The aqueous extractant solution used in my process should have an initial concentration of at least about 30 percent by weight of the defined class of solubilizer salts, in order to effect the maximum extraction of organic oxygenated compounds from the charging stock, and should preferably have a concentration between about 40 and 60 percent by weight of such salts, although higher concentrations may be used where the extraction conditions are such that the extractant solution is maintained in the liquid phase. The addition of water to the extractant stream during the course of the extraction procedure should be in a sufficient quantity to lower the concentration of solubilizer salts therein to below 30 percent by weight. The exact degree of lowering is not critical, since any such lowering produces a decrease in the quantity of contaminating hydrocarbons in the resulting aqueous extract; however, I prefer to add a sufficient quantity of water to dilute the extractant stream to between about 5 and 20 percent by weight of solubilizer salts.

In an embodiment of my process employing a continuous extraction column, the hydrocarbon charging stock may be introduced either into the bottom of the column or into an intermediate section thereof. In the latter case, the introduction of the diluting water may be effected wholly above the entry point of the charging stock, or wholly or partly below such point. It will be apparent, moreover, that equivalent modes of operation may be employed in embodiments of my process utilizing multiple-stage extraction, either with single-step batch extractors or continuous units.

My invention will be more fully understood from the following specific example:

Example

An organic phase, resulting from the hydrogenation of carbon monoxide in the presence of a fluidized, alkali-promoted iron catalyst, was analyzed and found to have the following composition:

| Component | Proportion | | |
|---|---|---|---|
| | mole per cent | vol. per cent | wt. per cent |
| Organic acids | 7.8 | 8.4 | 10.2 |
| Organic oxygenated compounds, except acids | 15.2 | 16.0 | 17.4 |
| Hydrocarbons | 77.0 | 75.7 | 72.4 |

A quantity of the organic phase was scrubbed with a dilute solution of sodium hydroxide to remove organic acids therefrom. The resulting aqueous solution was steam distilled, and the organic phase of the distillate was returned to the original organic phase. In this way, an aqueous solution of sodium organic-acid salts was obtained, wherein the constituent organic acids had an average molecular weight of 142. The resulting aqueous solution was then adjusted by dilution or evaporation to form solubilizer solutions having the range of concentrations noted in the table below.

Subsequently, a series of extraction experiments was carried out with each of the various concentrations of solubilizer solution, in order to demonstrate the effect of solubilizer concentration on the extent of hydrocarbon contamination of the resulting extract. In each series, a two-liter portion of the caustic-washed organic phase was shaken 15 minutes with successive 500-ml. portions of the solubilizer solution at room temperature or at a somewhat elevated temperature as required to maintain the solubilizer solution in the liquid state. The resulting aqueous extracts were steam distilled to separate therefrom a crude organic oxygenated compound phase, contaminated with hydrocarbons, and the organic distillates were analyzed. The results were as follows:

| Extraction No. | Solubilizer concentration, percent by weight | | | | | | |
|---|---|---|---|---|---|---|---|
| | 4.97 | 9.85 | 14.6 | 19.3 | 37.5 | 46.6 | 55.4 |

CRUDE ORGANIC OXYGENATED COMPOUNDS PLUS HYDROCARBONS, CUMULATIVE VOLUME PERCENT OF CAUSTIC-WASHED CHARGING STOCK

| | | | | | | | |
|---|---|---|---|---|---|---|---|
| 1 | 1.27 | 2.15 | 2.93 | 3.97 | 9.1 | 13.7 | 25.9 |
| 2 | 2.32 | 3.69 | 5.24 | 7.40 | 14.7 | 21.2 | 39.5 |
| 3 | 3.12 | 5.11 | 7.16 | 9.85 | 18.3 | 25.6 | 45.5 |
| 4 | 3.82 | 6.41 | 9.00 | 12.1 | 20.2 | 28.7 | 49.9 |
| 5 | 4.44 | 7.56 | 10.5 | 13.7 | 21.6 | 30.7 | 52.9 |

HYDROCARBON CONTAMINATION, VOLUME PERCENT OF CUMULATIVE CRUDE EXTRACT (ORGANIC OXYGENATED COMPOUNDS PLUS HYDROCARBONS)

| | | | | | | | |
|---|---|---|---|---|---|---|---|
| 1 | 0 | 12 | 19 | 25 | 28 | 45 | 68 |
| 2 | 3 | 15 | 21 | 25 | 30 | 44 | 67 |
| 3 | 4 | 17 | 23 | 28 | 30 | 45 | 65 |
| 4 | 5 | 19 | 24 | 30 | 31 | 47 | 65 |
| 5 | | 21 | 25 | 31 | 32 | 48 | 66 |

Reference will now be made to the attached flowsheets, Figures 2 and 3, which illustrate in greater detail the practical application of the phenomena described in the above example.

Figure 2:
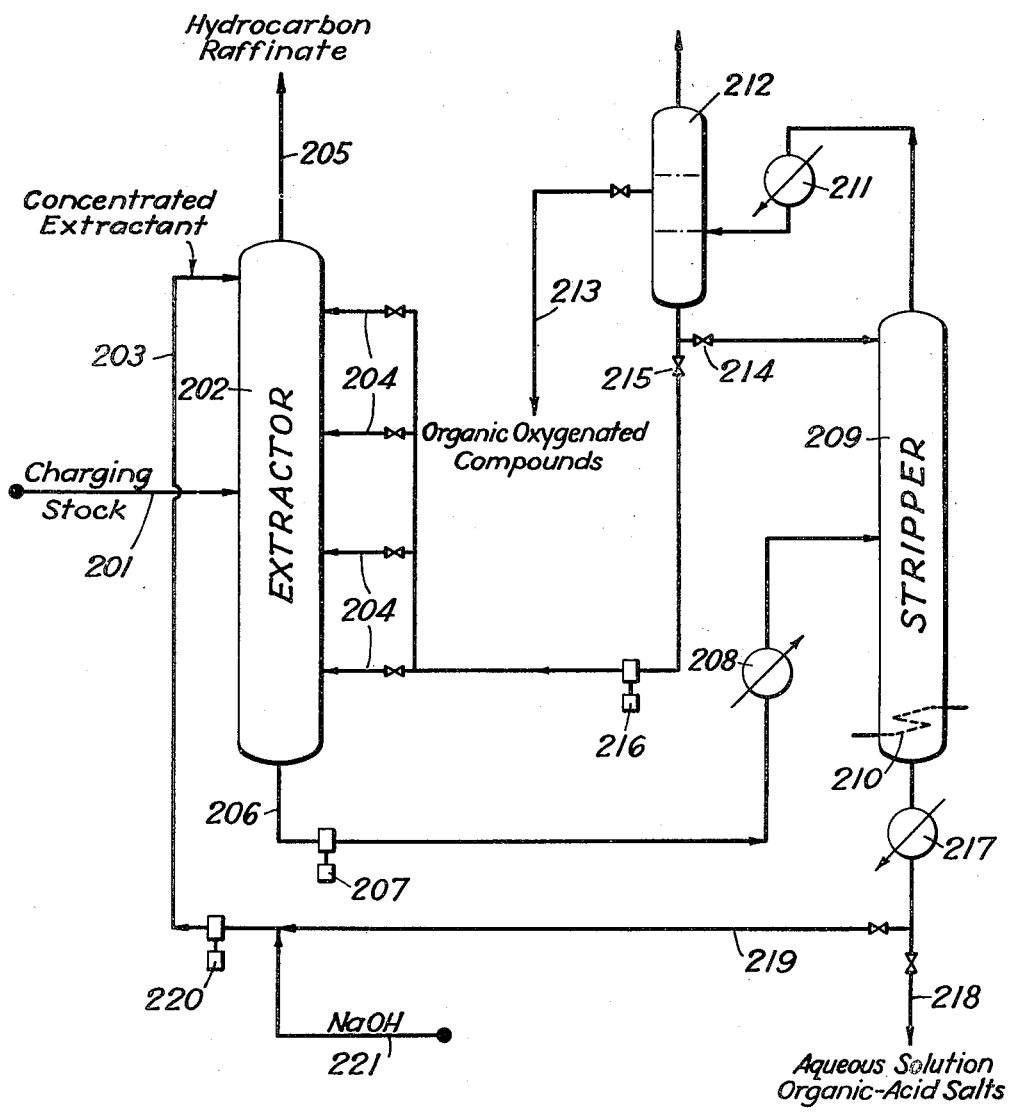

Figure 2 represents an elaboration of the process illustrated by Figure 1, embodying various recycle and recovery features.

A charging stock comprising organic oxygenated compounds and hydrocarbons is introduced through line 201 into an intermediate point of extraction column 202. An aqueous solution of organic-acid salts, preferably having a concentration between about 40 and 60 percent by weight, is introduced into the top of extraction column 202 through line 203; and as the extractant solution flows downward countercurrent to the charging stock, it is progressively diluted with water, introduced through valved lines 204, which may be spaced over part or all of the length of the column. The extent of dilution is preferably such as will produce an aqueous solution at the bottom of the extraction column containing between about 5 and 20 percent by weight of the defined class of solubilizer salts. From the top of the column through line 205 flows a hydrocarbon raffinate stream containing a comparatively small proportion of the organic oxygenated compounds originally present in the charging stock.

The aqueous extract emerging from the bottom of extraction column 202 through line 206 contains organic oxygenated compounds contaminated with only a minor proportion of hydrocarbons. It is transferred by pump 207 through heater 208 into an intermediate point of stripper 209, equipped with reboiler 210. Therein, the organic oxygenated compounds and hydrocarbon contaminants are distilled overhead, together with a sufficent quantity of water to raise the bottoms stream to the desired concentration for recycling to the top of extraction column 202. The distillate flows through condenser 211 into separator 212, from which the organic phase, comprising predominantly the organic oxygenated compounds, is withdrawn through valved line 213, and is thereafter processed by suitable techniques, including fractional distillation, extractive distillation, azeotropic distillation, chromatographic fractionation, selective esterification, and the like, to isolate the individual constituents thereof. The aqueous phase in separator 212 is refluxed in part to the top of stripper 209 through valved line 214, and the remainder is withdrawn through valved line 215, and is introduced by pump 216 through valved lines 204 into extraction column 202, as described above.

The bottom stream from stripper 209 is an aqueous solution containing between about 40 and 60 percent by weight of the defined class of solubilizer salts. It emerges through cooler 217 and is withdrawn in part through valved line 218 for regeneration and recovery of the organic acids contained therein by conventional means. The remainder flows through valved line 219 into pump 220, where it is commingled with a free base such as sodium hydroxide, introduced through line 221 in sufficient quantity to react with the organic acids contained in the charging stock; and the mixture is fed by pump 220 through line 203 to the top of extraction column 202.

Figure 3:
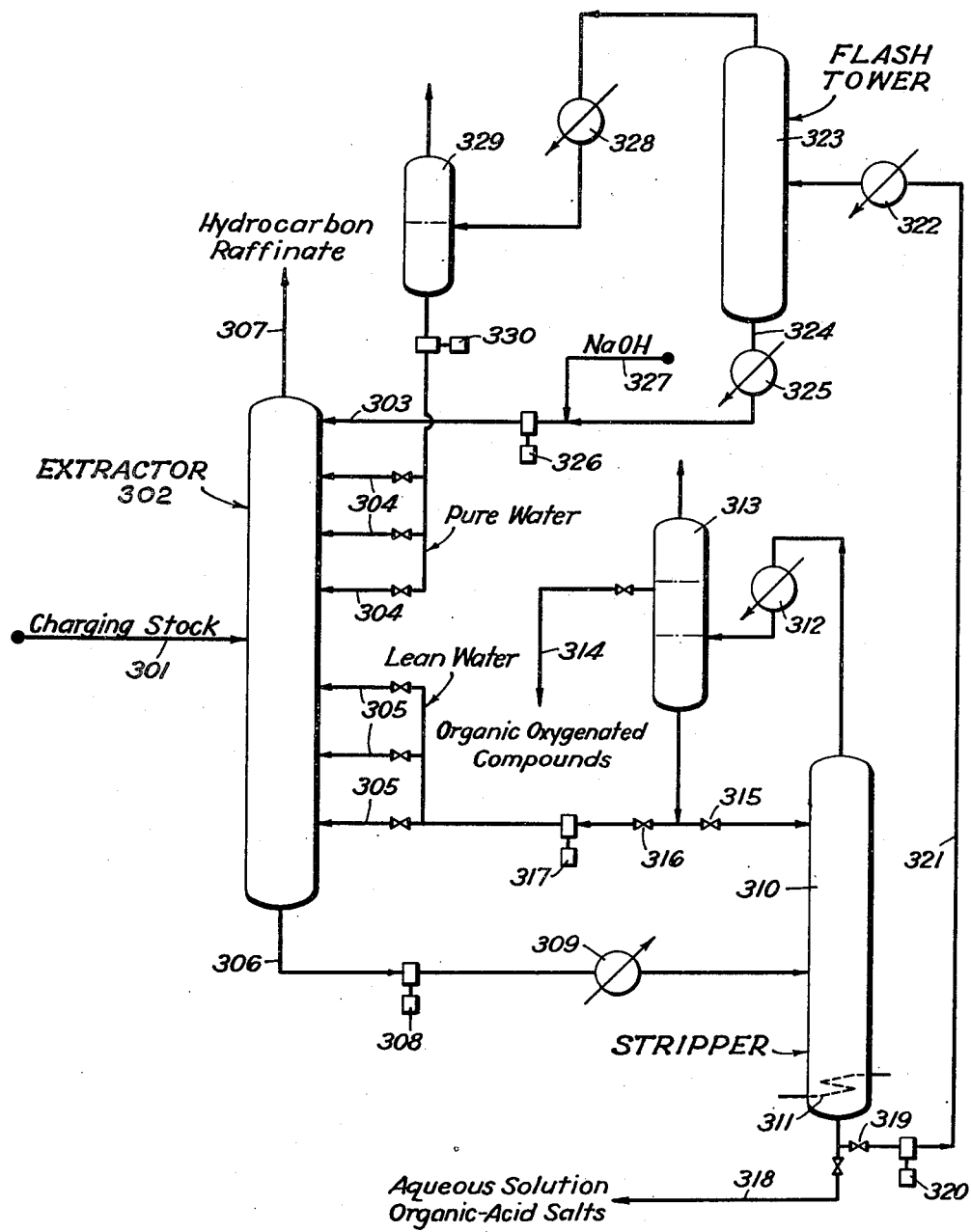

Figure 3 illustrates an embodiment of my invention wherein the aqueous extract is stripped of organic oxygenated compounds and reconcentrated in separate stages, in order to provide separate streams of pure water and of lean water containing organic oxygenated compounds, for use in diluting the aqueous extractant solution during the extraction of the charging stock.

A charging stock comprising organic oxygenated compounds and hydrocarbons is introduced through line 301 into an intermediate section of extraction column 302. A concentrated aqueous extractant solution, comprising in excess of 30 percent by weight of organic-acid salts, is introduced into the top of the column through line 303 and allowed to flow downward through the column countercurrent to the charging stock. During its downward passage, the extractant solution is progressively diluted with water, introduced stepwise into the extraction column through valved lines 304 and 305. The organic oxygenated compounds are extracted thereby from the charging stock, and are withdrawn from the bottom of extraction column 302 through line 306 as a solution in the extractant liquid, which now preferably contains less than 30 percent by weight of the defined class of solubilizer salts. The treated charging stock, now substantially depleted of organic oxygenated compounds, emerges as a hydrocarbon raffinate stream from the top of extraction column 302 through line 307, and is withdrawn to storage or to further processing.

The aqueous extract in line 306 is transferred by pump 308 through heater 309 into an intermediate section of stripper 310. Therein, the organic oxygenated compounds and a quantity of water are stripped out by reboiler 311, and are taken overhead through condenser 312 into separator 313. The organic phase in separator 313, comprising predominantly organic oxygenated compounds, is withdrawn through valved line 314 to storage or further processing. The aqueous phase is separator 313, containing a minor proportion of organic oxygenated compounds, is refluxed in part to the top of stripper 310 through valved line 315, and the remainder is withdrawn through valved line 316 to pump 317, by which it is fed through valved lines 305 into extraction column 302 to assist in effecing the progressive dilution of the extractant stream therein. Valved lines 305 are illustrated as entering extraction column 302 only at points below the entrance point of the charging stock. This is not essential, however, and it is contemplated that the lean water stream from separator 313 may be introduced into any point of extraction column 302 at which the concentration of organic oxygenated compounds in the extractant stream is greater than in the lean water stream.

From the bottom of stripper 310 flows a dilute aqueous solution of organic-acid salts, now substantially free from organic oxygenated compounds. A portion of this stream, containing organic-acid salts equivalent to the quantity of organic acids present in the charging stock, may be withdrawn through valved line 318 for liberation and recovery of the organic acids contained therein by conventional means. The remainder flows through valved line 319 into pump 320, by which it is transferred through line 321 and heater 322 into flash chamber 323. The temperature within the flash chamber is maintained at such a level that a sufficient quantity of water is flashed out of the liquid stream to increase the concentration of the residual aqueous solubilizer-salt solution therein to the required level for recycling to the top of extraction column 302. The liquid phase from flash chamber 323 flows out through line 324 and cooler 325 into pump 326, where it is commingled with an aqueous sodium hydroxide solution, introduced through line 327 in sufficient quantity to react with substantially all of the organic acids contained in the charging stock. The resulting solution of solubilizer salts and free base is fed into the top of extraction column 302 through line 303.

The vapors from flash chamber 323 are substantially pure water, in the sense that they are virtually free from organic oxygenated compounds, but they may contain a small proportion of entrained solubilizer salts, depending on the design of the flash chamber and the conditions under which it is operated. The vapors from the flash chamber are condensed in cooler 328, and the condensate flows through separator 329 into pump 330, by which it is fed through valved lines 304 into extraction column 302 for dilution of the extractant stream therein. The drawing illustrates the introduction of the substantially pure water stream from separator 329 into extraction column 302 at points above the point of entrance of the charging stock. This is the preferred procedure, since the aqueous stream from separator 329 contains no organic oxygenated compounds, which might be re-extracted therefrom by the upward-flowing charging stock and thereafter lost with the hydrocarbon raffinate. It will be apparent, however, that the alternative procedure of adding part or all of the pure water stream from separator 329 to extraction column 302 below the entrance point of the charging stock may also be employed.

While the foregoing flowsheets and example illustrate advantageous embodiments of my invention, it is to be understood that my invention is not limited to the charging stocks, process materials, apparatus and arrangement thereof, and manipulative steps described therein, but is to be construed broadly within the scope of the description and claims. In general, it may be said that any modifications or equivalents that would ordinarily occur to those skilled in the art are to be considered as lying within the scope of my invention.

In accordance with the foregoing specification, I claim as my invention:

1. In a process for separating a preferentially oil-soluble organic oxygenated compound selected from the group consisting of alcohols, aldehydes, and ketones from a solution thereof comprising predominantly hydrocarbons by contacting said solution with an aqueous extractant solution containing a substantially non-surface-active salt of a preferentially oil-soluble carboxylic acid, and withdrawing an aqueous extract containing said preferentially oil-soluble organic oxygenated compound, the improvement which comprises effecting said contacting in a plurality of stages in countercurrent flow while progressively diluting said extractant solution with water, said extractant solution initially containing more than 30 percent by weight of said salt, and finally containing less than 30 percent by weight of said salt.

2. The process of claim 1 wherein said substantially non-surface-active salt is a water-soluble salt of a preferentially oil-soluble aliphatic carboxylic acid.

3. The process of claim 2 wherein said salt is an alkali-metal alkanoate.

4. The process of claim 1 wherein said predominantly hydrocarbon solution of said preferentially oil-soluble organic oxygenated compound is contacted with said aqueous extractant solution at a temperature between about 20 and 50° C.

5. The process of claim 1 wherein said aqueous extractant solution initially contains between about 40 and 60 percent by weight of said salt.

6. The process of claim 1 wherein said aqueous extractant solution finally contains between about 5 and 20 percent by weight of said salt.

7. The process of claim 1 wherein said aqueous extractant solution contains a salt of a preferentially oil-soluble carboxylic acid having less than twelve carbon atoms in the molecule.

8. In a process for separating a preferentially oil-soluble organic oxygenated compound selected from the group consisting of alcohols, aldehydes, and ketones from a solution thereof comprising predominantly hydrocarbons by contacting said solutions with an aqueous extractant solution containing a substantially non-surface-active salt of a preferentially oil-soluble carboxylic acid, and withdrawing an aqueous extract containing said preferentially oil-soluble organic oxygenated compound, the improvement which comprises effecting said contacting in countercurrent flow while simultaneously diluting said extractant solution by spaced injection of water, said extractant solution initially containing above about 40 percent by weight of said salt, and finally containing less than about 20 percent by weight of said salt.

9. In a process for separating a preferentially oil-soluble organic oxygenated compound selected from the group consisting of alcohols, aldehydes, and ketones from a solution thereof comprising predominantly hydrocarbons by contacting said solution with an aqueous extractant solution containing a solubilizer consisting essentially of salts of a mixture of preferentially oil-soluble carboxylic acids having an average of less than eleven carbon atoms in the molecule, and withdrawing an aqueous extract containing said preferentially oil-soluble organic oxygenated compound, the improvement which comprises effecting said contacting in a plurality of stages in countercurrent flow while progressively diluting said extractant solution with water, said extractant solution initially containing more than 30 percent by weight of said salt, and finally containing less than 30 percent by weight of said salt.

10. In a process for separating a preferentially oil-soluble organic oxygenated compound selected from the group consisting of alcohols, aldehydes, and ketones from a solution thereof comprising predominantly hydrocarbons, the steps which comprise introducing said hydrocarbon solution into an intermediate point of a vertically elongated extraction zone; introducing into an upper portion of said extraction zone an aqueous extractant solution containing above about 40 percent by weight of a water-soluble salt of a preferentially oil-soluble carboxylic acid having less than twelve carbon atoms in the molecule; withdrawing from the bottom of said extraction zone an aqueous extract containing said organic oxygenated compound; distilling said aqueous extract and removing therefrom a distillate fraction containing water and substantially all of said organic oxygenated compound; condensing and stratifying said distillate fraction and withdrawing therefrom an organic phase containing said organic oxygenated compound, and an aqueous phase; effecting the spaced injection of said aqueous phase into a lower portion of said extraction zone, whereby the concentration of salt in the emerging extract stream is reduced to not more than about 20 percent by weight; removing water from the depleted aqueous extract in such quantity as to regenerate an aqueous extractant solution of the original concentration, and effecting the spaced injection of said water into an upper portion of said extraction zone; and recycling the regenerated aqueous extractant solution to the top of said extraction zone.

11. In a process for separating a preferentially oil-soluble organic oxygenated compound selected from the group consisting of alcohols, aldehydes, and ketones from a solution thereof comprising predominantly hydrocarbons by contacting said solution with an aqueous extractant solution containing a substantially non-surface-active salt of a preferentially oil-soluble carboxylic acid, and withdrawing an aqueous extract containing said preferentially oil-soluble organic oxygenated compound, the improvement which comprises effecting said contacting in countercurrent flow while progressively diluting said extractant solution with water, said extractant solution initially containing more than 30 percent by weight of said salt and finally containing less than 30 percent by weight of said salt, and steam-distilling said organic oxygenated compound from said aqueous extract while maintaining the salt concentration thereof below about 30 percent by weight.

EVERETT A. JOHNSON.

REFERENCES CITED

The following references are of record in the file of this patent:

UNITED STATES PATENTS

| Number | Name | Date |
| --- | --- | --- |
| 2,246,297 | Duncan et al. | June 17, 1941 |
| 2,274,750 | Soenksen et al. | Mar. 3, 1942 |
| 2,315,182 | Bemmann | Mar. 30, 1943 |
| 2,396,299 | Sweeney et al. | Mar. 12, 1946 |